United States Patent
Gimat et al.

(10) Patent No.: US 11,643,936 B1
(45) Date of Patent: May 9, 2023

(54) TURBINE STATOR BLADE MADE OF CERAMIC MATRIX COMPOSITE MATERIAL

(71) Applicant: SAFRAN CERAMICS, Le Haillan (FR)

(72) Inventors: Matthieu Arnaud Gimat, Moissy-Cramayel (FR); Eric Bouillon, Moissy-Cramayel (FR); Maxime François Roger Carlin, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/914,676

(22) PCT Filed: Mar. 22, 2021

(86) PCT No.: PCT/FR2021/050477
§ 371 (c)(1),
(2) Date: Sep. 26, 2022

(87) PCT Pub. No.: WO2021/191543
PCT Pub. Date: Sep. 30, 2021

(30) Foreign Application Priority Data

Mar. 27, 2020 (FR) ...................................... 2003081

(51) Int. Cl.
*F01D 5/18* (2006.01)
*F01D 5/28* (2006.01)

(52) U.S. Cl.
CPC ............... *F01D 5/282* (2013.01); *F01D 5/18* (2013.01)

(58) Field of Classification Search
CPC ............. F01D 5/18; F01D 5/282; F01D 5/147
See application file for complete search history.

(56) References Cited

U.S. PATENT DOCUMENTS 7,322,796 B2 * 1/2008 Pietraszkiewicz ...... F01D 9/041
29/889.22
7,371,049 B2 * 5/2008 Cunha ................... F01D 21/003
29/889.7

(Continued)

FOREIGN PATENT DOCUMENTS

EP  1 803 901 A2  7/2007
EP  2 975 215 A1  1/2016

(Continued)

OTHER PUBLICATIONS

International Preliminary Report on Patentability and the Written Opinion of the International Searching Authority as issued in International Patent Application No. PCT/FR2021/050477, dated Sep. 22, 2022.

(Continued)

*Primary Examiner* — Michael L Sehn
(74) *Attorney, Agent, or Firm* — Pillsbury Winthrop Shaw Pittman LLP

(57) ABSTRACT

A turbine stator blade made of ceramic matrix composite material includes a hollow blade profile and has a trailing edge and a leading edge, the blade including a first portion including an extrados face and a second portion distinct from the first portion including an intrados face, the first and second portions being connected to one another by a connection interface present at least on the trailing edge or leading edge, the connecting interface including a region of overlap between the first and second portions present on at least one longitudinal end of the blade profile and intended to be present outside of a flow path of a gas stream of the turbine, the blade also including a platform present at a longitudinal end of the blade profile and that includes a first portion integral with the extrados face and a second part integral with the intrados face.

14 Claims, 4 Drawing Sheets

(56) References Cited

U.S. PATENT DOCUMENTS

| | | | |
|---|---|---|---|
| 9,017,035 B2 * | 4/2015 | Marmilic | ............... F01D 5/189 |
| | | | 416/97 R |
| 2012/0301312 A1 | 11/2012 | Berczik et al. | |
| 2017/0138208 A1 * | 5/2017 | Hillier | ...................... F01D 9/02 |
| 2017/0328216 A1 | 11/2017 | Gallier | |

FOREIGN PATENT DOCUMENTS

| | | |
|---|---|---|
| EP | 3 459 732 A1 | 3/2019 |
| EP | 3 498 971 A1 | 6/2019 |
| WO | WO 2015/069673 A1 | 5/2015 |

OTHER PUBLICATIONS

International Search Report as issued in International Patent Application No. PCT/FR2021/050477, dated Apr. 28, 2021.

* cited by examiner

[Fig. 1]
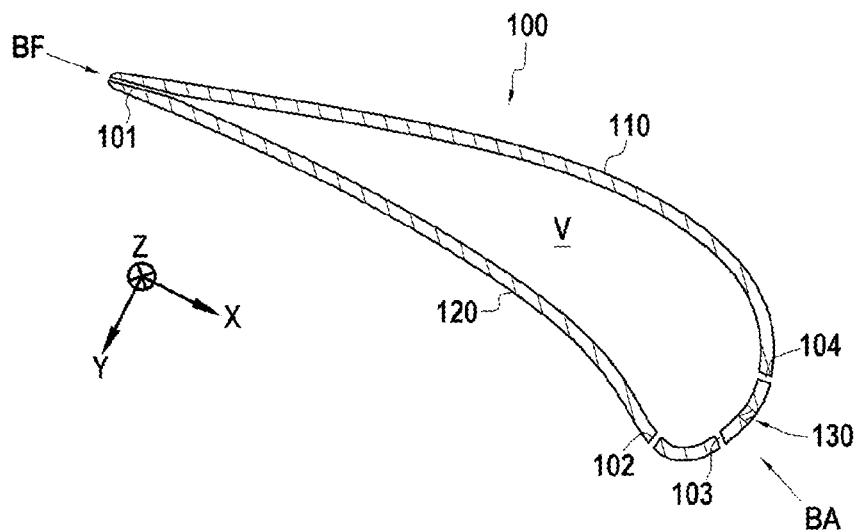
[Fig. 2A]
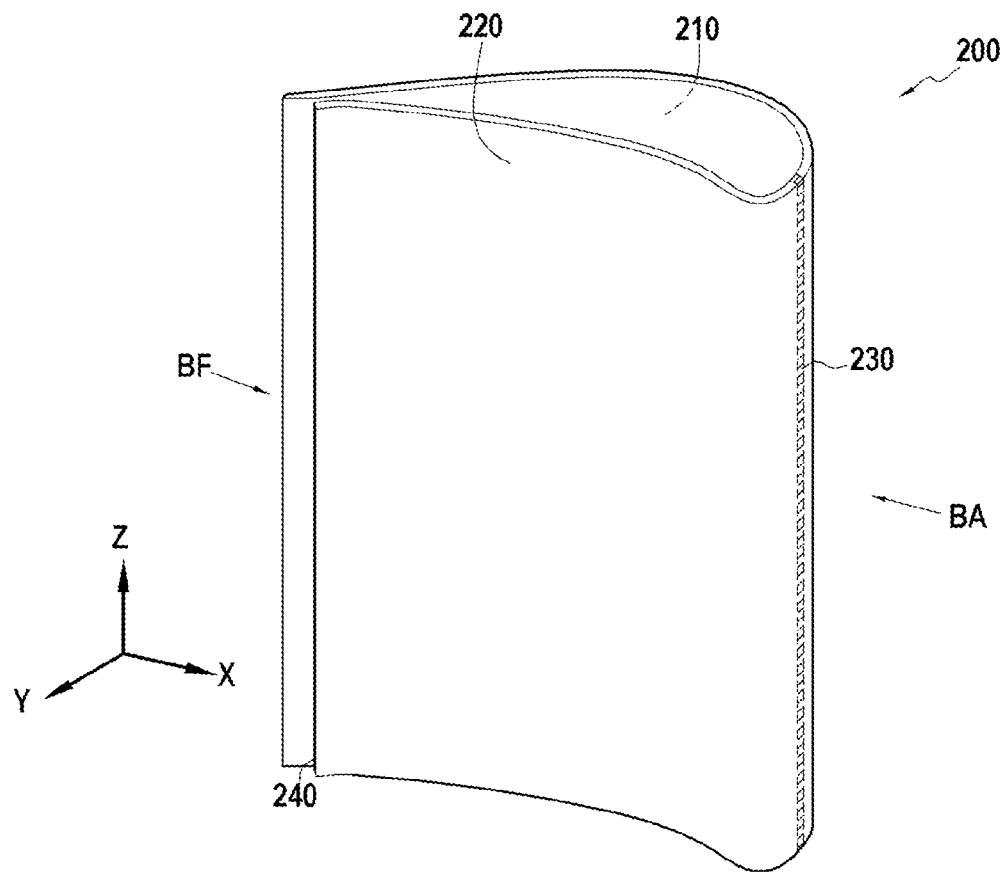

[Fig. 2B]
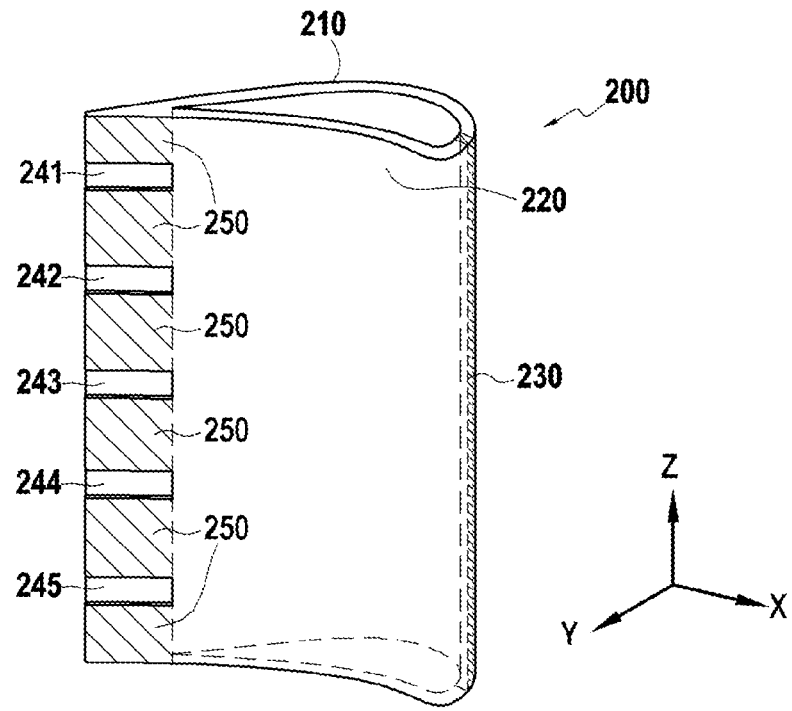
[Fig. 2C]
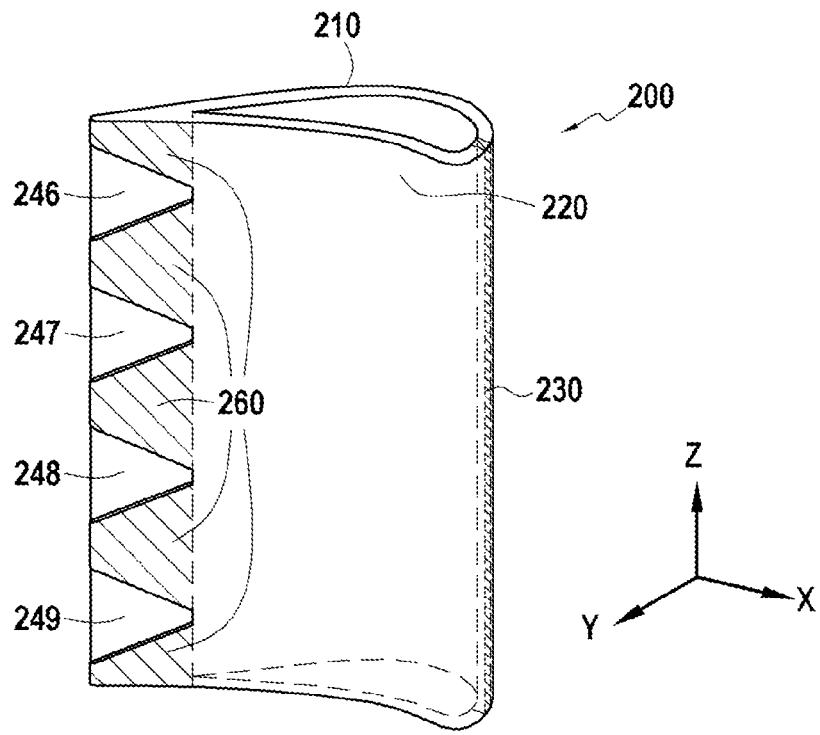

[Fig. 3]
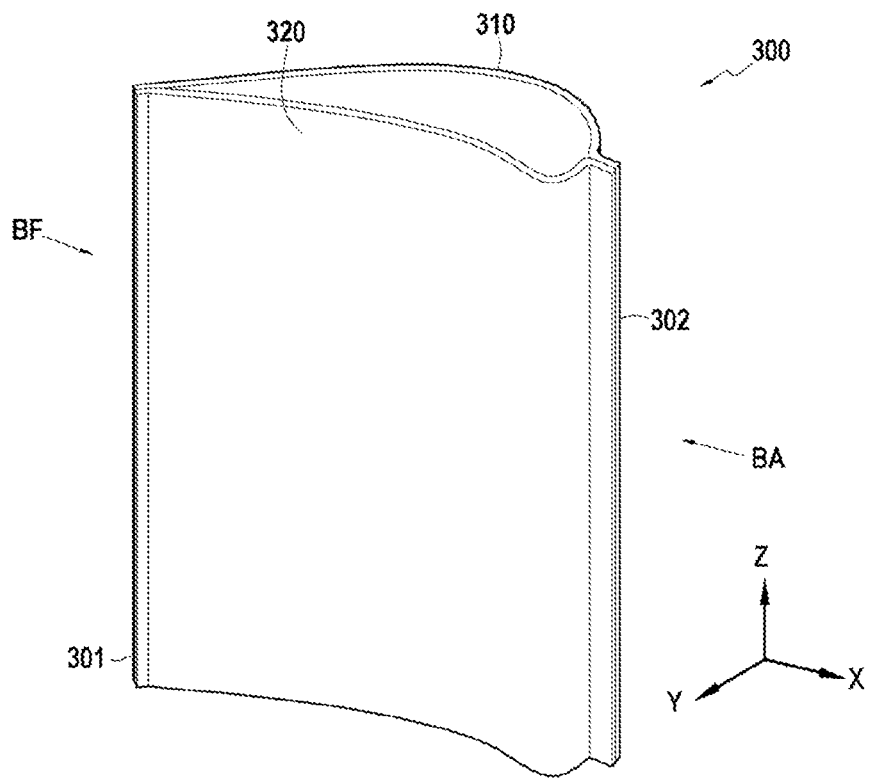
[Fig. 4]
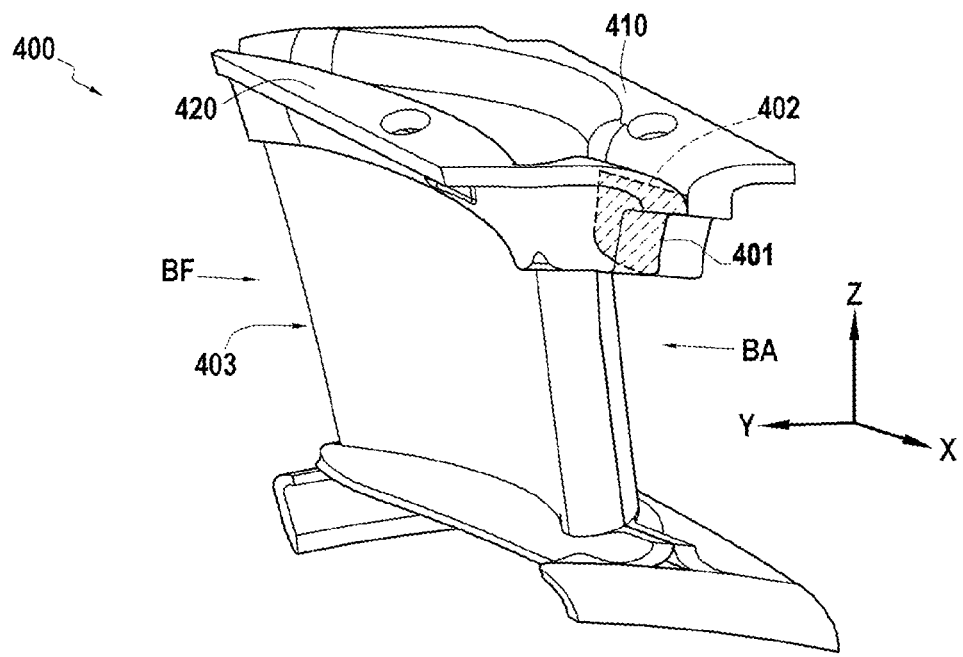

[Fig. 5]
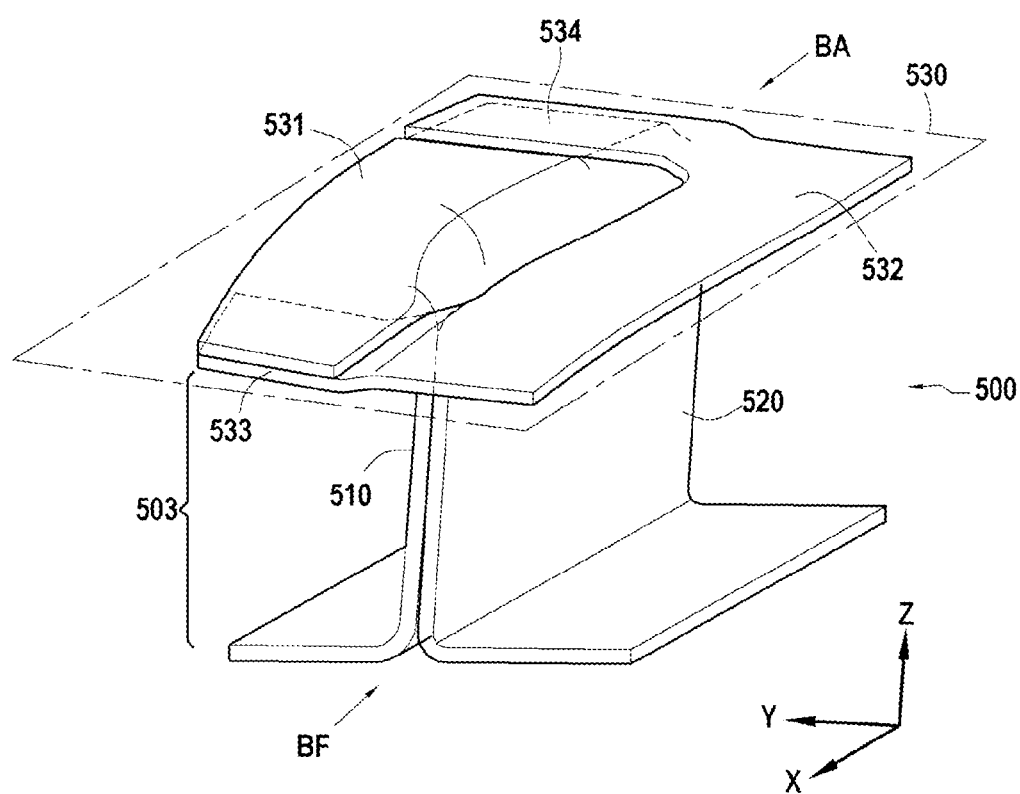

TURBINE STATOR BLADE MADE OF CERAMIC MATRIX COMPOSITE MATERIAL

CROSS-REFERENCE TO RELATED APPLICATIONS

This application is the U.S. National Stage of PCT/FR2021/050477, filed Mar. 22, 2021, which in turn claim priority to French patent application number 2003081 filed Mar. 27, 2020. The content of these applications are incorporated herein by reference in their entireties.

TECHNICAL FIELD

The invention relates to turbine blades made of ceramic matrix composite material ("CMC material"), and in particular to turbine stator blades, as well as their manufacturing methods.

PRIOR ART

Turbine distributors or stators are parts connected to the casing of a turbojet engine which channel and direct the gases of the primary flow, that is to say the hot flow. A turbine stage consists of a stationary blading called a distributor or stator, followed by a moving blading or rotor comprising a turbine disc and moving blades.

The blades of the first stages of distributors are generally hollow to be able to direct cooling air to the rotors located in the hub. A portion of this cooling air can also be intended for cooling the distributor.

To produce these parts of the hot portions of the turbomachines, ceramic matrix composite materials ("CMC" materials) have been proposed, because they have remarkable thermostructural properties. Indeed, they have mechanical properties making them suitable for constituting structural elements and the ability to retain these properties at high temperatures. In addition, these CMC materials have a much lower density than that of the metal materials usually used for the elements of the hot portions of turbomachines. Thus, they allow reducing the mass of these parts while being adapted for use in an environment at high temperature.

Nevertheless, the manufacture of these hollow parts from CMC material may have disadvantages. It may be necessary to use a core when making the hollow part in order to retain its shape. After consolidation of the part, it is therefore necessary to be able to constrain the geometry of the cavity of the hollow part in order to extract the core therefrom. Additional manufacturing difficulties are also associated with the fact of having cores capable of withstanding the temperatures associated with the manufacturing range and extractable despite a geometry without remains and/or removable, for example by chemical degradation, fusion, or dissolution.

It would be desirable to have a stator blade capable of withstanding the hot temperatures of a turbomachine without increasing its weight while avoiding the use of a core during its manufacture.

DISCLOSURE OF THE INVENTION

The invention relates to a turbine stator blade made of ceramic matrix composite material comprising at least one hollow blade profile and having a trailing edge and a leading edge, characterized in that it comprises a first portion comprising an extrados face of the blade profile and a second portion distinct from the first portion comprising an intrados face of the blade profile, the first and second portions being connected to one another by a connection interface present at least on the trailing edge or leading edge of the blade profile.

Having a blade formed of two distinct portions allows dispensing with a core during its manufacture. The two portions can be made separately without using a core before being assembled together. It is also possible to obtain the blade by co-densification of preforms of the two portions consolidated beforehand so that they retain their shape. These two manufacturing possibilities will be detailed below. In addition to overcoming the disadvantages associated with the use of a core during manufacture, the invention can allow to introduce functions on only one of the two portions without impacting the other portion, such as local thickening on one of the portions, a variation of the weaving between the two portions or on the same portion of the blade, thus allowing to have blades which are more adapted to the desired need.

In an exemplary embodiment, the blade comprises at least one vent on at least one of the trailing edge and the leading edge, said at least vent extending between an internal space of the blade profile and an external surface of the blade profile.

The fact of producing then assembling the two portions of the blade on a connection interface also allows adding cooling solutions during the manufacture of the blade.

The cooling operated by the vent is cooling by air film, also called "film cooling". The vent may be on the trailing edge, which thus allows cooling the trailing edge of the blade profile. Alternatively or in combination, the vent can be on the leading edge, which allows cooling the intrados or extrados face of the blade profile.

In an exemplary embodiment, the connecting interface comprises a region of overlap between the first and second portions which is present on at least one longitudinal end of the blade profile and intended to be present outside a flow path of a gas stream of the turbine.

In an exemplary embodiment, the region of overlap is reinforced by at least one mechanical connection, for example a bolted connection. This allows reinforcing the connection interface between the two portions of the blade without disturbing the aerodynamic flow.

In an exemplary embodiment, the blade also comprises at least one platform present at one longitudinal end of the blade profile, the platform comprising a first portion integral with the extrados face of the blade profile and a second portion integral with the intrados face of the blade profile, the first and second portions of the platform being connected to one another on at least one straddling portion belonging to the region of overlap.

This allows reinforcing the connection interface between the two portions of the blade.

In an exemplary embodiment, said at least one straddling portion is reinforced by a mechanical connection, for example a bolted connection. This allows reinforcing the connection interface between the two portions of the blade without disturbing the aerodynamic flow on the blade profile.

In an exemplary embodiment, the connection interface comprises a projecting portion present on at least one of the trailing edge or leading edge.

The invention also relates to a method for manufacturing a blade as described above, comprising the following steps:

providing a first fibrous preform intended to form the extrados face of the blade profile and a second fibrous preform intended to form the intrados face of the blade profile;

densifying the first and second fibrous preforms by a ceramic matrix; and assembling the first and second densified fibrous preforms by producing a connection interface present on at least the trailing edge or leading edge of the blade profile.

In an exemplary embodiment, the assembly step comprises the production of at least one vent extending between an internal space of the blade profile and an external surface of the blade profile, on at least one of the trailing edge and the leading edge.

In an exemplary embodiment, the connecting interface produced during the assembly step comprises a region of overlap between the first and second densified fibrous preforms which is present on at least one longitudinal end of the blade profile and intended to be outside a flow path of a gas stream of the turbine.

In an exemplary embodiment, the first and second fibrous preforms together define at least one platform preform intended to be present at one longitudinal end of the blade profile, the platform preform comprising a first portion integral with the first fibrous preform and a second portion integral with the second fibrous preform, and during assembly, the first and second portions of the platform preform being connected to one another on at least one straddling portion belonging to the region of overlap.

In an exemplary embodiment, the connection interface produced during the assembly step comprises a projecting portion present on at least one of the trailing edge and the leading edge of the blade profile.

The invention also relates to another method for manufacturing a blade as described above comprising the following steps:

providing a first fibrous preform intended to form the extrados portion of the blade profile and a second fibrous preform intended to form the intrados portion of the blade profile;

consolidating the first and second fibrous preforms;

holding the first and second consolidated fibrous preforms in position with at least one region for bearing on the trailing edge or leading edge of the blade profile between said consolidated fibrous preforms; and co-densifying the first and second consolidated fibrous preforms held in position with a common ceramic matrix, the connection interface being formed by the common ceramic matrix on the bearing region between said fibrous preforms.

In an exemplary embodiment, the method also comprises a step of locally applying a fugitive material on the bearing region, before the co-densification step, and the removal of the fugitive material, after the co-densification step, so as to form at least one vent extending between an internal space of the blade profile and an external surface of the blade profile, on at least one of the leading edge and the trailing edge.

In an exemplary embodiment, the connecting interface comprises a region of overlap between the first and second densified fibrous preforms which is present on at least one longitudinal end of the blade profile and intended to be outside a flow path of a gas stream of the turbine.

In an exemplary embodiment, the first and second fibrous preforms together define at least one platform preform intended to be present at one longitudinal end of the blade profile, the platform preform comprising a first portion integral with the first fibrous preform and a second portion integral with the second fibrous preform, and when it is held in position, the first and second portions of the platform preform being contacted on at least one straddling portion belonging to the region of overlap.

In an exemplary embodiment, the connection interface comprises a projecting portion present on at least one of the trailing edge and the leading edge of the blade profile.

In an exemplary embodiment and regardless of the manufacturing method implemented, the first and second fibrous preforms are produced by three-dimensional weaving.

The stator blade according to the invention has the advantage of being able to be produced in different ways: assembly and connection of the first and second portions previously densified separately or assembly and connection of the two fibrous preforms during densification by a common ceramic matrix.

BRIEF DESCRIPTION OF THE DRAWINGS

Other features and advantages of the present invention will emerge from the description given below, with reference to the appended drawings which illustrate exemplary embodiments without any limiting character.

FIG. 1 schematically and partially shows a turbine stator blade in cross section with respect to the longitudinal direction according to a first embodiment of the invention.

FIG. 2A schematically and partially shows a perspective view of a blade profile according to a second embodiment of the invention.

FIG. 2B schematically and partially shows a perspective view of a blade profile according to a third embodiment of the invention.

FIG. 2C schematically and partially shows a perspective view of a blade profile according to a fourth embodiment of the invention.

FIG. 3 schematically and partially shows a perspective view of a blade profile according to a fifth embodiment of the invention.

FIG. 4 schematically and partially shows a blade according to a sixth embodiment of the invention.

FIG. 5 schematically and partially shows a perspective view of a blade according to a seventh embodiment of the invention.

DESCRIPTION OF EMBODIMENTS

In FIGS. 1 to 2C, the connection interface 130 and 230 present between the first 110, 210 and second 120, 220 portions of the blade has been exaggerated in order to improve its visibility.

FIG. 1 is a sectional view of the blade profile of a stator blade according to a first embodiment of the invention. The section is taken transversely to the longitudinal direction Z of the blade (plane (XY)).

The blade is made of ceramic composite material and comprises a hollow blade profile 100. The blade profile 100 has a trailing edge BF and a leading edge BA. The blade comprises a first portion 110 forming the extrados face of the blade profile 100 and a second portion 120 forming the intrados face of the blade profile 100. The two portions 110 and 120 of the blade are connected to one another by a connection interface 130 present on the leading edge BA in the example shown. The two portions 110 and 120 of the blade are integral on the connection interface 130 in order to form the blade profile 100.

More generally, the connection interface 130 is present on the trailing edge BF or on the leading edge BA or both on the leading edge BA and on the trailing edge BF.

The internal volume V of the blade profile 100 extends between its two longitudinal ends and forms a circulation channel for a cooling air flow. In order to route the cooling air to the external surface of the blade profile 100 or to surrounding hot parts, the blade may comprise vents 101, 102, 103 and 104. For example, the vent 101 present on the trailing edge BF allows cooling the trailing edge BF, the vent 102 present on the leading edge BA on the side of the intrados face allows cooling the intrados face of the blade profile 100 and the vents 103 and 104 present on the leading edge BA on the side of the extrados face for 104 and on the side of the intrados face for 103 allow cooling the extrados face of the blade profile 100. The vents 101 to 104 communicate the internal volume V with the external volume of the blade profile in order to provide passages for the cooling air. An example has been shown where several vents are present but of course this does not depart from the scope of the invention when a single vent is present.

FIGS. 2A, 2B and 2C show different possible arrangements for the vents made on a stator blade according to the invention.

In FIG. 2A, the vent 240 is present on the entire height of the blade profile 200 on the trailing edge BF. The connection interface 230 between the two portions 210 and 220 of the blade will therefore only be present on the leading edge BA.

According to another example, the vents 241 to 249 are present on the entire height of the blade profile 200, but are separated by connection regions 250 and 260 between the two portions 210 and 220. The vents 241 to 245 can be of substantially constant section along their length and for example be cylindrical in shape (see FIG. 2B). Alternatively, the section of the vents can vary along their length, this section being able to increase when moving in the direction of the outer volume of the blade profile as illustrated in FIG. 2C. In the example of FIG. 2C, vents 246 to 249 have a conical shape. In the examples illustrated in FIGS. 2B and 2C, the vents 241 to 249 are uniformly distributed along the longitudinal direction Z. However, it does not depart from the scope of the invention if the distribution of the vents along the longitudinal direction Z is not regular.

More generally, the shape and location of the vents are adapted on the trailing or leading edges of the blade profile according to the cooling needs of the blade and its surrounding elements.

In order to reinforce the connection between the two portions 110, 210 and 120, 220 of the blade, it is possible to change the connection interface 130, 230 between these two portions. FIGS. 3, 4 and 5 show a few examples according to the invention of a connection interface between the two portions of the blade.

In FIG. 3, the connection interface 301, 302 comprises two projecting portions present on the trailing edge BF and on the leading edge BA of the blade profile 300. This type of projecting portion allows reinforcing the connection interface 301, 302 between the two portions 310 and 320 of the blade.

It is also possible to add vents on at least one of the two projecting portions 301 and 302. It is also possible to have a projecting portion on one of the trailing BF or leading BA edges of the blade profile 300 and to have on the other edge, a vent extending on the entire height of the blade profile 300.

In FIG. 4, the connecting interface 401 comprises a region 402 of overlap between the first 410 and second 420 portions of the blade present on the outer longitudinal end of the blade profile 400 outside a flow path 403 of the gas stream. In this example, the region of overlap 402 is on the leading edge BA of the blade profile 400, but it is also possible to find the same type of region of overlap 402 on the trailing edge BF.

In addition, the region of overlap 402 shown in FIG. 4 is disposed on the outer longitudinal end of the blade profile 400, but it can also be placed on the inner longitudinal end of the blade profile 400.

The blade shown in FIG. 5 comprises a blade profile 500 and two portions 510 and 520 assembled together to form an extrados face and an intrados face of the blade profile. It also comprises an external platform 530 present at one longitudinal end of the blade profile 500. The outer platform 530 delimits the flow path 503. This platform 530 comprises, according to an exemplary embodiment of the invention, a first portion 531 integral with the first portion 510 of the blade and a second portion 532 integral with the second portion 520 of the blade. The two portions 531 and 532 of the platform 530 are connected to one another on two straddling portions 533 and 534 in the example shown. The portions 531 and 532 overlap on the straddling portions 533 and 534.

FIG. 5 shows only the external platform 530 of the blade. However, the blade may comprise, at the other longitudinal end of the blade profile 500, an internal platform, opposite to the external platform 530, comprising two portions as defined for the external platform 530.

FIGS. 4 and 5 thus describe a reinforcement of the connection between the two portions 410, 51) and 420, 520 of the blade outside a flow path 403, 503 of the gas in the turbine. The advantage of this type of reinforcement outside the flow path is to be able to add mechanical connections, for example bolted connections, to these connection interfaces to reinforce it without changing the aerodynamic properties of the blade profile 400, 500.

A first example of a method for manufacturing a blade according to the invention is described below.

In this first example, the method comprises a first step of providing two fibrous preforms. The first fibrous preform is intended to form the extrados face of the blade profile 100 and is therefore intended to form the first portion 110 of the blade shown in FIG. 1. The second fibrous preform is intended to form the intrados face of the blade profile 100 and is therefore intended to form the second portion 120 of the blade shown in FIG. 1.

In a second step, the two fibrous preforms are densified by a ceramic matrix. The ceramic matrices of the fibrous preforms can be made wholly or partly by chemical vapor infiltration, or partly or wholly by liquid means. The liquid technique can be melt infiltration or a polymer impregnation pyrolysis technique. The formation of a ceramic matrix by the techniques mentioned is known per se. It is also possible to use a combination of these techniques to form the matrices. The matrices can, for example, comprise silicon carbide.

Finally in a third step, the first and second densified preforms are assembled thanks to the production of a connection interface present on at least the trailing edge or leading edge of the blade profile.

The connection interface can for example be produced by bonding by applying an adhesive to the two densified fibrous preforms on the trailing edge or leading edge or by any other known means.

According to another example, the connection interface is formed by adding a joint between the two densified fibrous preforms.

According to an exemplary embodiment, the assembly step comprises the production of at least one vent extending between an internal space of the blade profile and an external surface of the blade profile on the trailing edge or leading edge of the blade profile. The shape of the fibrous preforms can be adapted to produce these vents.

The vents can also be created by not connecting certain areas of the leading and trailing edges of the blade profile. Holding tools can also be used during assembly to constrain the vent dimensions.

According to another exemplary embodiment of the method according to the invention, to reinforce the connection between the two fibrous preforms, the connecting interface comprises a region of overlap between the first and second densified fibrous preforms which is present on at least one longitudinal end of the blade profile and intended to be outside a flow path of a gas stream of the turbine.

To produce this region of overlap, the shape of the fibrous preforms is adapted during their production in order to form the size of the desired region of overlap. During assembly, the two densified preforms are connected on the region of overlap in the same way as on the connection interface.

It is also possible to add a mechanical connection to this region of overlap to reinforce the connection between the two fibrous preforms.

According to another exemplary embodiment, also allowing reinforcing the connection between the two fibrous preforms, the two preforms together define at least one platform preform intended to be present at one longitudinal end of the blade profile. The platform preform can be produced at the same time as the first and second fibrous preforms. It comprises a first portion integral with the first fibrous preform and a second portion integral with the second fibrous preform. During assembly of the densified fibrous preforms, the two portions of the platform are connected to one another on at least one straddling portion belonging to the region of overlap outside the flow path of a gas stream of the turbine.

According to an exemplary embodiment of the invention, to reinforce the connection between the two portions of the platform preform, a mechanical connection, for example a bolted connection, is added to the straddling portion. This allows consolidating the connection between the two fibrous preforms without changing the aerodynamic profile of the blade. It also allows for a large number of vents being placed on the trailing and the leading edges of the blade profile to improve the cooling ability of the blade while maintaining a robust blade structure.

According to another exemplary embodiment, to reinforce the connection between the two fibrous preforms, the connection interface may comprise a projecting portion present on the trailing edge and/or the leading edge of the blade profile. This projecting portion can be produced during the production of the two fibrous preforms during which the trailing edges and/or the leading edges of the two fibrous preforms are extended axially (in the direction X in FIG. 3). When assembling the two preforms, the extensions of the trailing and/or leading edges of the two densified preforms are connected together to form projecting portions.

The connection of the extensions of the fibrous preforms can be carried out in the same way as the connection interface between the two portions of the blade.

A second method for manufacturing a blade according to the invention is described below.

In this second manufacturing method, the first step consists in providing a first fibrous preform intended to form the extrados portion of the blade profile 100, therefore the first portion 110 of the blade shown in FIG. 1, and a second fibrous preform intended to form the intrados portion of the blade profile 100, therefore the second portion 120 of the blade shown in FIG. 1.

The second step consists in consolidating the two fibrous preforms so that they are self-supporting. This consolidation step before assembly eliminates the need for a core to hold and assemble the two fibrous preforms. Consolidation consists of partially filling the pores of the two fibrous preforms with a consolidation matrix phase allowing them to retain their shape without the assistance of holding tools.

In a third step, the first and second consolidated fibrous preforms are held in position and positioned bearing on each other on at least one bearing region present on the trailing edge or on the leading edge of the blade profile. It is also possible to have several bearing regions on the trailing edge and/or on the leading edge.

Then in a fourth step, the two consolidated fibrous preforms held in position are co-densified with a common ceramic matrix. A connection interface is also formed by the common ceramic matrix on the bearing region (or the bearing regions) between said two fibrous preforms.

The densification techniques previously described for the first method can also be used for the co-densification step of the second method.

According to an exemplary embodiment of the invention, this second method can also comprise a step of locally applying a fugitive material on the bearing region between the two consolidated fibrous preforms before the co-densification step, and a step of removing the fugitive material after co-densification. These additional steps allow creating at least one vent extending between an internal space and an external surface of the blade profile on the trailing edge or leading edge of the blade profile.

The application of a fugitive material, such as an antiwetting material, such as refractory varnish (with boron nitride), or a fusible material on a surface allows to avoid densification by the common matrix of this surface. Therefore, it allows not connecting the two consolidated fibrous preforms held in position on this surface, and thus creating a passage between the inside of the blade profile and the outside of the blade profile in order, for example, to evacuate a cooling air flow.

According to another exemplary embodiment of the method according to the invention, to reinforce the connection between the two fibrous preforms, the connection interface may comprise a region of overlap between the two densified fibrous preforms which is present on at least one longitudinal end of the blade profile and intended to be outside a flow path of a gas stream of the turbine. To form this region of overlap, the shape of the two fibrous preforms provided is adapted, and the connection between the two preforms on this region is made by the common ceramic matrix.

It is also possible to add a mechanical connection to the region of overlap, for example a bolted connection, to reinforce the connection between the two fibrous preforms.

In order to reinforce the connection between the two preforms, the two fibrous preforms together define at least one platform preform intended to be present at one longitudinal end of the blade profile. The platform preform comprises a first portion integral with the first fibrous preform and a second portion integral with the second fibrous preform. When the two consolidated fibrous preforms are held in position, the two portions of the platform preform are contacted on a straddling portion belonging to the region of overlap. The two portions of the platform preform are connected on the region of overlap by the common ceramic matrix. It is also possible to add a means of reinforcement thereto to improve the connection in this region.

According to an exemplary embodiment, to reinforce the connection between the portions of the platform preform, a mechanical connection, for example a bolted connection, is added to the straddling portion. This consolidates the connection between the two fibrous preforms without changing the aerodynamic profile of the blade.

According to another exemplary embodiment of the method according to the invention, to reinforce the connection between the two fibrous preforms, the connection interface may comprise a projecting portion present on at least one of the trailing edge or leading edge of the blade profile. This projecting portion comes from the axial extension (in the direction X of FIG. 3) of the two fibrous preforms on their trailing and/or leading edge during their production, and from the connection by the common ceramic matrix of the extensions of the two preforms during co-densification.

Whether for the first or the second manufacturing method, the first 110 and second 120 fibrous preforms can be produced by three-dimensional weaving. The wires used to form the preforms can be ceramic, in particular silicon carbide, or carbon. The preforms can, for example, be shaped in a shaping tool.

According to another exemplary embodiment of the invention, the first and second preforms, regardless of the method, can be obtained by draping a plurality of unidirectional fibrous webs or strata of two-dimensional or three-dimensional fabric.

Whether for the first or the second manufacturing method, the first and second fibrous preforms can comprise "notches" in which a wedge or other holding tool can be placed to avoid depositing material on these notches and thus form vents on the trailing and/or leading edge. The advantage of using wedges or any other holding tool is to be able to calibrate the size of the vents.

The invention claimed is:

1. A turbine stator blade made of ceramic matrix composite material comprising:
   at least one hollow blade profile and having a trailing edge and a leading edge,
   a first portion comprising an extrados face of the blade profile and a second portion distinct from the first portion comprising an intrados face of the blade profile, the first and second portions being connected to one another by a connection interface present at least on the trailing edge or leading edge of the blade profile, the connecting interface comprising a region of overlap between the first and second portions which is present on at least one longitudinal end of the blade profile and intended to be present outside a flow path of a gas stream of the turbine, and
   at least one platform present at one longitudinal end of the blade profile which comprises a first portion integral with the extrados face of the blade profile and a second portion integral with the intrados face of the blade profile, the first and second portions of the platform being connected to one another on at least one straddling portion belonging to the region of overlap.

2. The turbine stator blade according to claim 1, comprising at least one vent on at least one of the trailing edge and the leading edge, said at least one vent extending between an internal space of the blade profile and an external surface of the blade profile.

3. The turbine stator blade according to claim 1, wherein the connection interface comprises a projecting portion present on at least one of the trailing edge and the leading edge of the blade profile.

4. A method for manufacturing the turbine stator blade according to claim 1, comprising:
   providing a first fibrous preform intended to form the extrados face of the blade profile and a second fibrous preform intended to form the intrados face of the blade profile;
   densifying the first and second fibrous preforms by the ceramic matrix, and assembling the first and second densified fibrous preforms by producing the connection interface present on at least the trailing edge or leading edge of the blade profile.

5. The method for manufacturing the turbine stator blade according to claim 4, wherein the assembling comprises the production of at least one vent extending between an internal space of the blade profile and an external surface of the blade profile, on at least one of the trailing edge and the leading edge.

6. The method for manufacturing the turbine stator blade according to claim 4, wherein the connecting interface comprises the region of overlap between the first and second densified fibrous preforms which is present on at least one longitudinal end of the blade profile and intended to be outside the flow path of the gas stream of the turbine.

7. The method for manufacturing the turbine stator blade according to claim 6, wherein the first and second fibrous preforms together define at least one platform preform intended to be present at one longitudinal end of the blade profile, the platform preform comprising the first portion integral with the first fibrous preform and the second portion integral with the second fibrous preform, and during assembly, the first and second portions of the platform preform being connected to one another on the at least one straddling portion belonging to the region of overlap.

8. The method for manufacturing the turbine stator blade according to claim 4, wherein the connection interface comprises a projecting portion present on at least one of the trailing edge and the leading edge of the blade profile.

9. The method for manufacturing the turbine stator blade according to claim 4, wherein the first and second fibrous preforms are produced by three-dimensional weaving.

10. A method for manufacturing the turbine stator blade according to claim 1, comprising:
    providing a first fibrous preform intended to form the extrados portion of the blade profile and a second fibrous preform intended to form the intrados portion of the blade profile;
    consolidating the first and second fibrous preforms;
    holding the first and second consolidated fibrous preforms in position with at least one region for bearing on the trailing edge or leading edge of the blade profile between said consolidated fibrous preforms, and
    co-densifying the first and second consolidated fibrous preforms held in position with a common ceramic matrix, the connection interface being formed by the common ceramic matrix on the bearing region between said fibrous preforms.

11. The method for manufacturing the turbine stator blade according to claim 10, further comprising locally applying a fugitive material on the bearing region, before the co-densification step, and the removal of the fugitive material, after the co-densification step, so as to form at least one vent extending between an internal space of the blade profile and an external surface of the blade profile, on at least one of the leading edge and the trailing edge.

12. The method for manufacturing the turbine stator blade according to claim 10, wherein the connecting interface comprises the region of overlap between the first and second densified fibrous preforms which is present on the at least one longitudinal end of the blade profile and intended to be outside the flow path of the gas stream of the turbine.

13. The method for manufacturing the turbine stator blade according to claim 12, wherein the first and second fibrous preforms together define at least one platform preform intended to be present at one longitudinal end of the blade profile, the platform preform comprising the first portion integral with the first fibrous preform and the second portion integral with the second fibrous preform, and when it is held in position, the first and second portions of the platform preform being contacted on the at least one straddling portion belonging to the region of overlap.

14. The method for manufacturing the turbine stator blade according to claim 10, wherein the connecting interface comprises a projecting portion present on at least one of the trailing edge and the leading edge of the blade profile.

\* \* \* \* \*